United States Patent
Morris et al.

(10) Patent No.: US 6,915,383 B2
(45) Date of Patent: *Jul. 5, 2005

(54) RECEIVER APPARATUS AND METHOD

(75) Inventors: Steven Morris, Taipei (TW); Octavius J. Morris, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 506 days.

This patent is subject to a terminal disclaimer.

(21) Appl. No.: 10/173,366

(22) Filed: Jun. 17, 2002

(65) Prior Publication Data

US 2003/0002432 A1 Jan. 2, 2003

(30) Foreign Application Priority Data

Jun. 30, 2001 (GB) .............................. 0116116

(51) Int. Cl.[7] .............................. G06F 12/08
(52) U.S. Cl. .................. 711/118; 711/133; 707/203
(58) Field of Search ............................... 711/118, 161, 711/162, 117, 133; 707/204, 203

(56) References Cited

U.S. PATENT DOCUMENTS 5,764,992 A  6/1998 Kullick et al. ............. 395/712
6,442,598 B1 * 8/2002 Wright et al. .............. 709/217
6,457,170 B1 * 9/2002 Boehm et al. .............. 717/106
6,643,655 B2 * 11/2003 Oashi et al. ................. 707/10
6,813,692 B2 * 11/2004 Morris et al. ............... 711/133

FOREIGN PATENT DOCUMENTS

WO    WO9965229    12/1999    ............ H04N/5/00
WO    WO9965230    12/1999    ............ H04N/5/00

* cited by examiner

*Primary Examiner*—Hiep T. Nguyen

(57) ABSTRACT

In a DSM-CC receiver (12), a signal comprising a periodically repeated plurality of data sections is received. Storage means (14) is provided for caching the data sections included in the signal, and said storage means incorporates a file management mechanism based on file names. Each data section is received (100) under a corresponding file name, and the received file names are modified (140) within the receiver to distinguish between previous or subsequent versions of the same data sections of the signal that are stored in said storage means. Files currently in use are not overwritten, but are marked (135) for later deletion (155). Individual files can be extracted from DSM-CC modules and cache. In this case, individual file names are modified by reference to version information received for the module as a whole.

19 Claims, 2 Drawing Sheets

RECEIVER APPARATUS AND METHOD

The present invention relates to communications systems and in particular those employing multiplex signals comprising a periodically repeated plurality of modules.

Interactive digital television applications such as tele-banking, tele-shopping or electronic newspapers are typically broadcast in a carousel like fashion where the corresponding data sections are repeated periodically in the transport stream.

DSM-CC (Digital Storage Media-Command and Control) object carousels are such a type of broadcast file system used in interactive digital TV. These have been specified as the delivery system for content in several standards, including the UK Digital Terrestrial Group guidelines and the DVB Multimedia Home Platform (MHP). See for example ISO/IEC 13818-6A. DSM-CC object carousel consists of a number of 'modules', each of which contains part of a larger directory structure, either as several small files (in which case the maximum module size is 64 Kbytes) or a single large file (where the module can be any size). These modules are then broadcast with the digital TV signal, with some modules possibly being repeated to improve access times. Once all modules have been broadcast, the broadcaster returns to the beginning and starts broadcasting the modules again. This process bears a close resemblance to the way that teletext pages are broadcast, with DSM-CC modules replacing individual teletext pages as the basic unit. EP 1022901 A, for example, describes an information server for providing DSM-CC carousels in an information stream.

Digital TV receivers that use DSM-CC typically cache at least some DSM-CC modules, to avoid the long delays in accessing modules encountered with systems like teletext which are caused by having to wait for the requested module's turn to be broadcast. As some new set-top boxes include hard disk units to provide some local storage, it becomes possible for a set-top box that needs to support DSM-CC broadcast file systems to use a part of the local hard disk as a cache, rather than having to perform this caching in memory. Using the hard disk for this caching is known for example from International patent application WO99/65229 (commonly assigned with the present application) which proposes a system for caching data sections on a hard drive (for instance) in such a way that the information for a complete set of multiplex signals is contained in a single information section.

Using the hard disk for caching in this manner has several benefits. Storing the cached modules on disk frees memory that would otherwise be used for storing these modules. The set-top box, therefore, has a reduced memory footprint in comparison with other boxes. Furthermore, the platform can now cache considerably more modules, due to the extremely low relative cost of hard disk capacity.

Many present systems usually require only a simple DSM-CC cache because of the relatively simple nature of the applications that are possible, and the fact that they cannot access the broadcast file system directly. However, on an MHP platform, an application broadcast using DSM-CC can access the object carousel and load files from it, and may indeed choose to connect to and use any number of other object carousels as well. This adds a further level of complexity to cache management.

Every DSM-CC module has a version number, indicating when it was last updated, and DSM-CC allows the broadcaster to dynamically update elements of the file system and broadcast the changed module(s) with a new version number. In this way, the application and the DSM-CC cache can detect that the file has been updated. The old version cannot simply be replaced, however, because it is possible that an application is accessing the file. If the contents of the file were to change halfway through being read, the application would be badly affected. Yet at the same time any new requests for the file should get the updated version. Thus, it is potentially necessary to keep multiple versions of the same file in the cache.

The prior application mentioned above does not, however, teach any way of differentiating between different versions of the same module.

In the case where the cache is stored on a local hard disk, one solution would be to add a version number to the structure of the file system to cope with this, but this is not a built-in facility of common file systems, and would require changes to the file system design.

In order to address the cache management problems highlighted above, it is proposed to append the version of the module containing a file to the name of the file automatically when caching the file on a local disk. This has several advantages since it permits any current file system used in the industry to be used without modification. This saves developer effort since no change or testing of the file system structure is required. Also, as the cache is file system-independent, porting to a new file system type or operating system is made significantly easier. The addition of version numbers within filenames also prevents inconsistent information from being presented to an application.

In a first embodiment of the invention there is provided a method of cache management in a receiver, for receiving a signal comprising a periodically repeated plurality of data sections, said receiver including storage means for caching the data sections included in the signal, wherein said storage means incorporates a file management mechanism based on file names, each data section being received under a corresponding file name, and wherein the received file names are modified within the receiver to distinguish between previous or subsequent versions of the same data sections of the signal that are stored in said storage means.

In one embodiment, a version number of the data section is appended to the received file name of the data section before it is added to the cache.

The data section may be received with associated version information, said information being used to determine the modification of the file name. Version numbers are defined within DSM-CC specifications. Alternatively, the receiver may generate a time stamp or other version information locally.

The storage means may comprise a local hard drive.

The data sections may be modules, each module comprising of group of one or more files, or the data sections may be the files contained in the modules.

In one embodiment, files may be extracted and stored individually, using version information received for the group as a whole.

Where the data sections are made of modules, manipulation of the groups of files can be simplified by using sub-directories.

The file name of the data section may be used to mark for deletion a redundant version of a data section.

The invention yet further provides an apparatus comprising storage means and file management means arranged for caching periodically received data sections by a method as set forth above, and as further set forth in the appended claims.

Embodiments of the invention will now be described, by way of example only, with reference to the accompanying drawings, in which.

Figure 1:
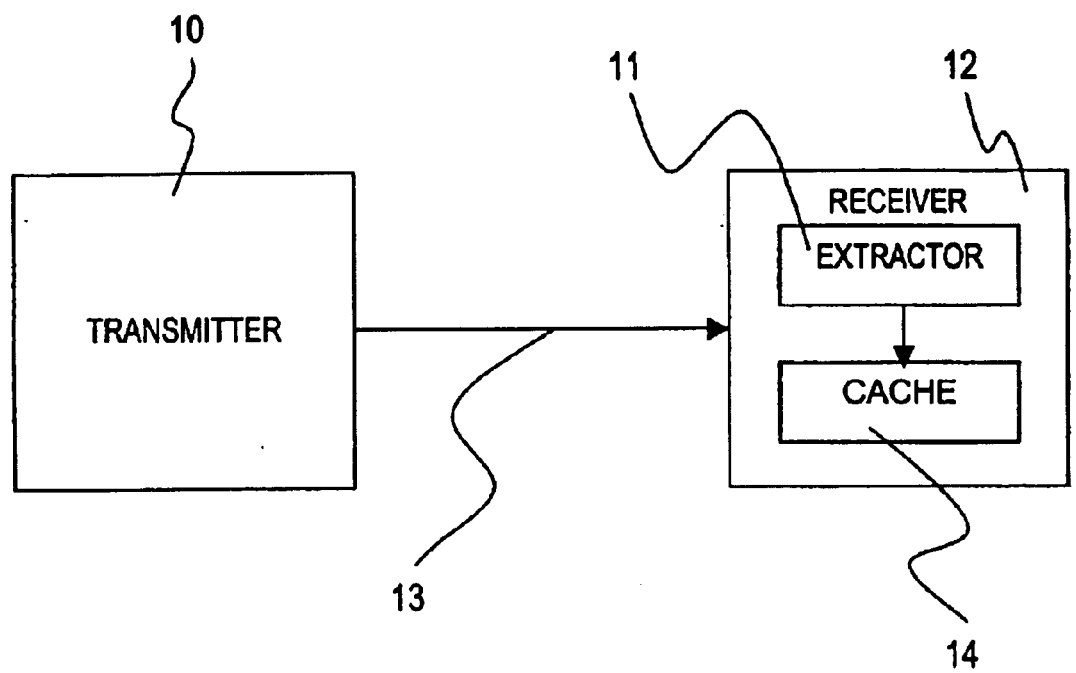
FIG. 1 is a generalised block diagram of apparatus embodying the invention.

Referring to the block diagram of FIG. 1 there is provided a transmitter 10 for transmitting a signal 13, such as a digital television signal. This signal comprises of a number of modules that are repeated periodically. A receiver 12, such as the type commonly referred to as a "set top box", receives said signal. The receiver 12 consists of means for extracting files 11 and modules from the signal and a cache memory 14 which, in this example, is part of a hard disk. The cache memory 14 is used to store certain modules where necessary, such that they can be accessed quickly. The extractor 11 includes file management means for adding and deleting files from the cache memory in an orderly fashion.

Where an advanced set-top box for interactive digital television has an integrated hard disk, this hard disk can be used as a DSM-CC cache in those cases where DSM-CC is used, e.g. DVB MHP. A certain amount of hard disk space is reserved for use as a DSM-CC cache, in the same way that current set-top boxes reserve a certain area of memory for this purpose. The advantage of this is that a disk cache can be much larger without seriously compromising performance of the hard disk for other applications.

Figure 2:
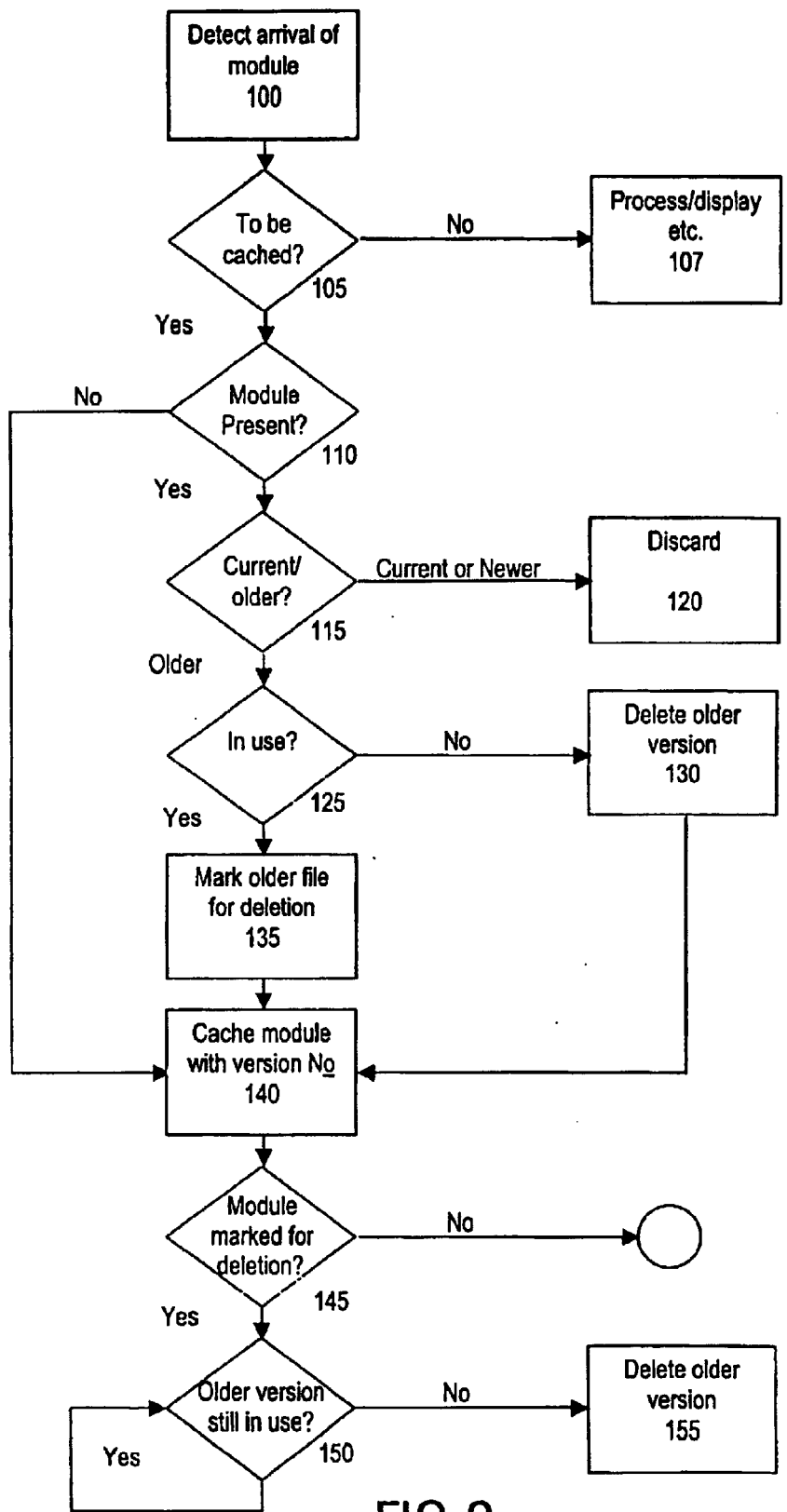
FIG. 2 is a flowchart depicting an example of a method according to the invention in operation.

Referring to the flowchart of FIG. 2, the preferred method comprises the following steps:

At step 100, when the platform detects the arrival of a DSM-CC module from the broadcast network, it can choose, at step 105, whether to cache this module. If it does choose to cache the module then the platform examines the current cache to see if the module is already present, at step 110. Otherwise, at 107, the module is processed and displayed in the normal manner.

If the check at step 110 shows the module is not already present then it is simply cached with its version number (step 140). If, however that module is already present then, at 115, it is determined whether that module already in the cache is an older version or a current or later version. This is done by checking the version number of the newly arrived module against that of the module stored in cache. If the module already cached is a current or later version then, at 120, the newly loaded module is discarded. If it is older, the platform checks, at 125, whether any of the cached module is currently in use (i.e. whether an application has a file in that module open for reading). If it is not, the old module is deleted, at 130, from the disk cache.

At step 140, the new module is cached on disk with the version number appended as part of the file name. If the older version of the module is in use, the platform will, at step 135, mark this older version for deletion. Any new operations that open a file in that module will be directed to the version of the file in the cache with the highest version number.

When an application closes a file handle (and thus stops accessing the file), the platform checks whether the module is marked for deletion, at step 145, and whether any other applications are accessing the module, at step 150. In the case where no other file handles are open to files in that module and the module is marked for deletion, the module is deleted from the cache, at 155.

Therefore, the module version and other information such as whether the module is marked for deletion (and possibly the number of currently open file handles) can be appended to the file name of the cached module. This makes version comparisons easier and avoids changes to the design of the file systems or the use of separate module version databases. Most standard programming libraries allow the manipulation of file systems using regular expressions to identify a set of filenames.

The skilled reader will appreciate that numerous variations are possible within the principles of the method and apparatus described above. The method can also be applied to caching individual files within DSM-CC modules by unpacking the files into the cache. In this case, every file name will have the version number of their containing DSM-CC module appended. This allows the application of the module replacement strategy described above to be carried out either at the file level (to ensure timely updates of files wherever possible) or at the module level (to ensure the consistency between all files broadcast in the same module). Caching at the module level in this way is more complex, but sub-directories can be used to make the manipulation of groups of files easier.

Accordingly it will be understood that the embodiments illustrated herein are presented as examples to aid understanding, and are not intended to be limiting on the spirit and scope of the invention claimed.

What is claimed is:

1. A method of cache management in a receiver, for receiving a signal comprising a periodically repeated plurality of data sections, said receiver including storage means for caching the data sections included in the signal, wherein said storage means incorporates a file management mechanism based on file names, each data section being received under a corresponding file name, and wherein the received file names are modified within the receiver to distinguish between previous or subsequent versions of the same data sections of the signal that are stored in said storage means.

2. A method as claimed in claim 1 wherein a version number of the data section is appended to the received file name of the data section before it is added to the cache.

3. A method as claimed in claim 1 wherein data sections are received with associated version information, said information being used to determine the modification of the file name.

4. A method as claimed in claim 1 wherein the data sections are received in the form of modules, each module comprising a group of one or more files.

5. A method as claimed in claim 4 wherein manipulation of the groups of files is simplified by using sub-directories.

6. A method as claimed in claim 4 wherein said file name modification is performed at a module level.

7. A method as claimed in claim 4 wherein individual files are extracted from said modules and individual file names are modified by reference to version information received for the module as a whole.

8. A method as claimed in claim 1 wherein the file name of a data section is used to mark for deletion a redundant version of a data section.

9. A method as claimed in claim 1 wherein said receiver is a broadcast receiver and the received data comprises DSM-CC (Digital Storage Media-Command and Control) standard modules.

10. A receiver apparatus for receiving a signal comprising a periodically repeated plurality of data sections, said receiver including storage means for caching the data sections included in the signal, wherein said storage means incorporates a file management mechanism based on file names, each data section being received under a corresponding file name, the receiver further including means comprises means for modifying received file names to distinguish between previous or subsequent versions of the same data sections of the signal that are stored in said storage means.

11. An apparatus as claimed in claim 10 wherein said modifying means is arranged to append a version number of the data section to the received file name of the data section before it is added to the cache.

12. An apparatus as claimed in claim 10 wherein data sections are received with associated version information, said information being used by the modifying means to determine the modification of the file name.

13. An apparatus as claimed in claim 10 wherein the storage means comprises a local hard drive.

14. An apparatus as claimed in claim 10 arranged to receive the data sections in the form of modules, each module comprising a group of one or more files.

15. An apparatus as claimed in claim 14 wherein the storage means is arranged to manipulate groups of files using sub-directories.

16. An apparatus as claimed in claim 14 wherein said modifying means is arranged to perform said file name modification at a module level.

17. A apparatus as claimed in claim 14 wherein said file means is arranged to extract individual files from said modules and said modifying means is arranged to modify individual file names by reference to version information received for the module as a whole.

18. An apparatus as claimed in claim 14 wherein the file name of a data section is used to mark for deletion a redundant version of a data section.

19. An apparatus as claimed in claim 10 wherein said receiver is a broadcast receiver and the received data comprises DSM-CC (Digital Storage Media-Command and Control) standard modules.

* * * * *